United States Patent [19]

Amada et al.

[11] Patent Number: 4,841,521
[45] Date of Patent: Jun. 20, 1989

[54] METHOD AND SYSTEM FOR BIDIRECTIONALLY TRANSMITTING DATA

[75] Inventors: Eiichi Amada, Kodaira; Hirotoshi Shirasu, Yokohama, both of Japan; Hiroshi Takatori, Ottawa, Canada; Tohru Kazawa, Kokubunji, Japan; Toshiro Suzuki, Tama, Japan; Takanori Miyamoto, Fuchu, Japan; Tatsuya Kameyama, Hachioji, Japan

[73] Assignee: Hitachi, Ltd., Tokyo, Japan

[21] Appl. No.: 55,036

[22] Filed: May 28, 1987

[30] Foreign Application Priority Data

May 28, 1986 [JP] Japan ................................ 61-121009
Feb. 9, 1987 [JP] Japan ................................ 62-26243

[51] Int. Cl.⁴ .......................... H04B 3/20; H04B 1/56; H04L 5/16
[52] U.S. Cl. .......................................... 370/31; 370/29
[58] Field of Search ................... 370/29, 31, 84, 24, 370/30

[56] References Cited

U.S. PATENT DOCUMENTS 3,956,589 5/1976 Weathers et al. ................... 370/31
4,630,257 12/1986 White .................................. 370/29
4,644,525 2/1987 Ellis et al. ........................... 370/29

OTHER PUBLICATIONS

Siemens, Siemens Transdaten, Datenubertragunsprozeduren SuW 55774, 471.2,0 von 4/71 S. 1-21 & English Translation of pp. 5-13.

Haruo Ogiwara, Yasukazu Terada: Design Philosophy and Hardware Implementation for Digital Subscriber Loops, In; IEEE Transactions on Communication, vol. COM-30, No. 9, Sep. 1982, S. 2057-2065.

Primary Examiner—Robert L. Griffin
Assistant Examiner—Wellington Chin
Attorney, Agent, or Firm—Antonelli, Terry & Wands

[57] ABSTRACT

A method and a system for bidirectional transmission/-reception of data between two terminal stations, in which each transmission period is divided into a plurality of first time sections for relatively low speed data transmission and at least one second time section for relatively high speed data transmission, the direction of transmission between the terminal stations being predetermined in each of the first time sections, while the direction of transmission between the terminal stations is reversible in each of the second time sections, each second time section being preceded by one of the first time sections. Transmission of information data and control data is performed from one to the other terminal station in a predetermined direction in each first time section, and the direction of data transmission between the terminal stations in the next second time section is determined on the basis of control data contained in the relatively low speed data transmission.

14 Claims, 7 Drawing Sheets

METHOD AND SYSTEM FOR BIDIRECTIONALLY TRANSMITTING DATA

BACKGROUND OF THE INVENTION

The present invention relates to a bidirectional transmission method and system, and more particularly to a bidirectional transmission method and system suitable to attain relatively low speed full-duplex communication and relatively high speed half-duplex communication through one transmission medium.

In the prior art a bidirectional transmission system which uses a two-wire transmission line, an echo canceller system in which a sending signal and a received signal are separated at a transmission/reception terminal, and a time division transmission system in which a transmission time and a reception time are separated are well known. In high speed data transmission, a time division transmission system does not need means for eliminating an echo, and hence a hardware configuration thereof is simpler than that of an echo canceller system. The time division system is described in detail in IEEE Transaction on Communications Com-30, No. 9 (1982), pages 2057 to 2065.

In the above-mentioned prior art technique, full-duplex communication is generally carried out between a data terminal equipment (DTE) and an exchanger. In a half-duplex communcaiton mode, in which data is transmitted in only one of the two transmission directions, only one-half of the transmission capability of the transmission line is utilized.

SUMMARY OF THE INVENTION

It is an object of the present invention to provide a bidirectional transmission system which can efficiently utilize the transmission capability of a transmission line even in a relatively high speed data transmission mode such as a half-duplex transmission mode.

It is another object of the present invention to efficiently attain relatively low speed data communication, such as relatively low speed full-duplex communcation, and relatively high speed data communication, such as relatively high speed half-duplex communication, through one and the same transmission medium.

In accordance with one aspect of the present invention, one transmission period (frame) is divided into a time section in which the direction of transmission is fixed and a time section in which the direction of transmission is variable or reversible, and control information for controlling the direction in the time section in which the direction of transmission is variable or reversible is transmitted by using a portion of a signal sent in the time section in which the direction of transmission is fixed, so that a transmitter/receiver at a terminal station can control the direction of transmission in the time section in which the direction of frame transmission is variable, on the basis of control information or control information and the state of data to be transmitted by the terminal station.

In the half-duplex communication mode, data is transmitted in only one of two directions at a time. Accordingly, when a terminal station connected to a transmitter/receiver requests communication, the data can be transmitted by using the time section of fixed transmission direction, but the fixed transmission direction must be preset between the two transmitter/receivers. In one embodiment of the present invention, bilateral or reversible data transmission is carried out in one or more fixed time sections prior to one or more time sections of fixed transmission direction, so that the communication direction in the time section for fixed direction transmission can be controlled for each transmission period by the use of a portion of the information sent in the above-mentioned fixed section(s) and further, if necessary, by communication requests exchanged between the transmitter/receivers at the two terminal stations. As a result, the transmission of data which takes most portions of the transmission period can be efficiently carried out.

Most portions of the apparatus may be those of a conventional apparatus with only the partial modification of a transmission direction controller of the transmitter/receiver. Thus, the apparatus is economical.

In accordance with one embodiment of the present invention, relatively high speed half-duplex communication is attained by using a two-wire transmission line, and it is also applicable to full-duplex communication without modification of the hardware. Accordingly, the data transmission rate with the two-wire transmission line is improved, and the data transmitter/receiver is economized and simplified.

In accordance with another embodiment of the present invention, the transmitter/receiver of the two terminal stations coupled through the two-wire transmission line, may be identical in construction. Accordingly, manufacturing cost is reduced. When low speed data has to be sent but high speed data is not present in the terminal, a dummy signal is sent so that a timing signal is exactly extracted.

DESCRIPTION OF THE PREFERRED EMBODIMENTS

Figure 1A:
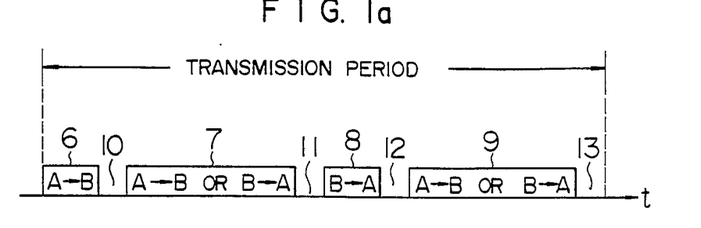
FIGS. 1a and 1b show an operation of one embodiment of bidirectional transmission in accordance with the present invention.
Figure 1B:
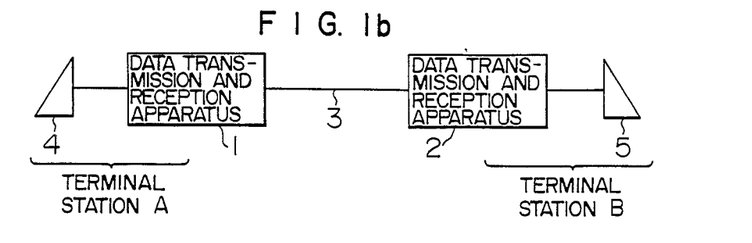

FIGS. 1a and 1b illustrate operation of a bidirectional transmission system using a two-wire transmission line in accordance with an embodiment of the present invention.

As shown in FIG. 1b, two terminal stations A and B are coupled by a transmission line, for example, a two-wire transmission line 3. The terminal station A has a data transmitter/receiver 1 which couples a telephone set or data terminal 4 to the line 3, and the terminal station B has a data transmitter/receiver 2 which couples a telephone set or a data terminal 5 to the line 3. In such a communication system, a frame format of a signal transmitted through the two-wire transmission line 3 is shown in FIG. 1a. In one frame (one transmission period), there are provided time sections of fixed transmission direction, such as a time section 6 (A to B) and a time section 8 (B to A), and time sections 7 and 9 in which the transmission direction is variable or reversible and which can be used for the transmission of either one of A to B and B to A. Numerals 10, 11, 12 and 13 denote guard times which prevent interference of bidirectional signals on the transmission line.

In the present embodiment, there are two variable transmission direction time sections (7 and 9), although only one such time section may be provided as will be explained in another embodiment.

In the present embodiment, control information for controlling the transmission direction in the variable transmission direction time sections 7 and 9 is transmitted in the fixed direction time sections 6 and 8.

In the present embodiment, the transmission period is 125 μs, a transmission clock is 2.56 MHz, the number of bits of the variable direction time section is 26 bits in each direction, a frame synchronization signal comprises 4 bits and a transmission direction control signal for the variable direction time section comprises 4 bits. Thus, three channels;
(1) 144 Kbps channel for bilateral data transmission,
(2) 32 Kbps channel for controlling the direction of the variable direction time section, and
(3) 1.536 Mbps channel for variable direction transmission
are attained on the two-wire transmission line.

In order to attain those three channels, it is necessary to transmit 244 bits of data in 125 μs and it takes 95.4 μs. Thus, the remaining 29.6 μs may be allotted to the guard times (10, 11, 12, 13).

An example of switching of the transmission direction is explained with reference to FIG. 2. Numeral 14 denotes low speed data such as voice which need real time and bilateral transmission, and numeral 15 denotes high speed data which does not need real time and bilateral transmission. When one data transmitter/receiver 1 communicates with the other data transmitter/receiver 2, the low speed data is first transmitted from A to B and the high speed data is transmitted next, and then the low speed data is transmitted from B to A and the high speed data is transmitted next, and the above steps are repeated, as shown in FIG. 2(a).

Figure 2:
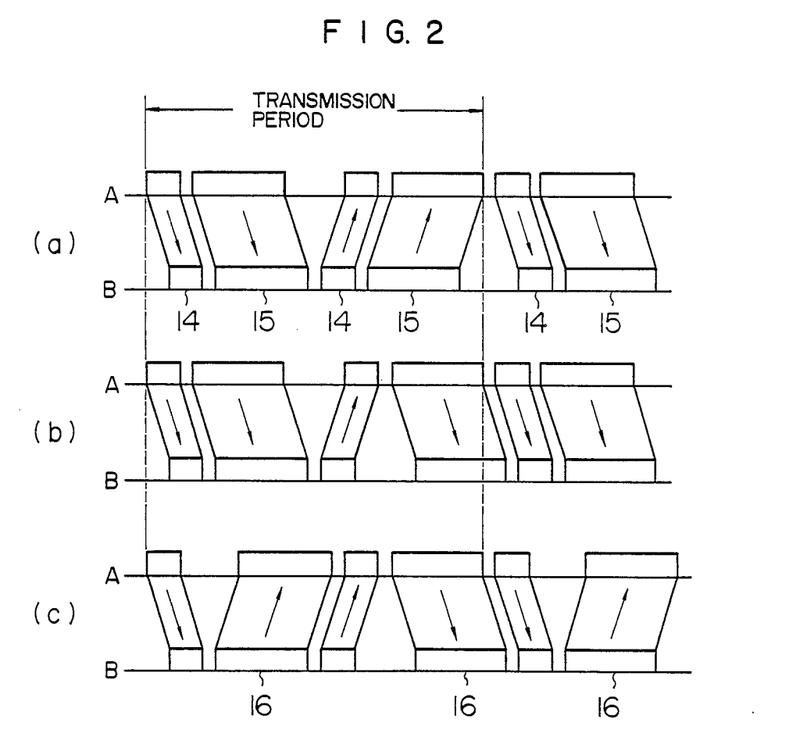
FIG. 2 illustrates time-serial operation of the embodiment shown in FIGS. 1a and 1b.

When the terminal station A has high speed data to be transmitted but the terminal station B has no high speed data to be transmitted, the low speed data and the high speed data are transmitted from A to B, then the low speed data is transmitted from B to A, as shown in FIG. 2(b). When station A detects that no high speed data is transmitted from station B, station A transmits high speed data to the station B. By repeating the above steps, the low speed data is transmitted bilaterally between A and B but the high speed data is transmitted unilaterally from A to B. When station A has no high speed data to be transmitted and station B has high speed data to be transmitted, the reverse process is carried out.

When neither station A nor B has high speed data to be transmitted, low speed data is first transmitted along with transmission direction control bits (e.g., for high speed data transmission) from A to B, as shown in FIG. 2(c). When station B detects that no high speed data is transmitted from the station A, dummy bits 16 are sent from B to A. Then, the low speed data is transmitted along with transmission direction control bits (e.g., for high speed data transmission) from B to A, and when station A detects that no high speed data is transmitted from station B, the dummy bits 16, which may be, for example, of the same bit number as that of the high speed data, are sent from A to B. The dummy bits 16 have no significance as information and they may be an all-"0" pattern to allow extraction of timing.

Figure 3:
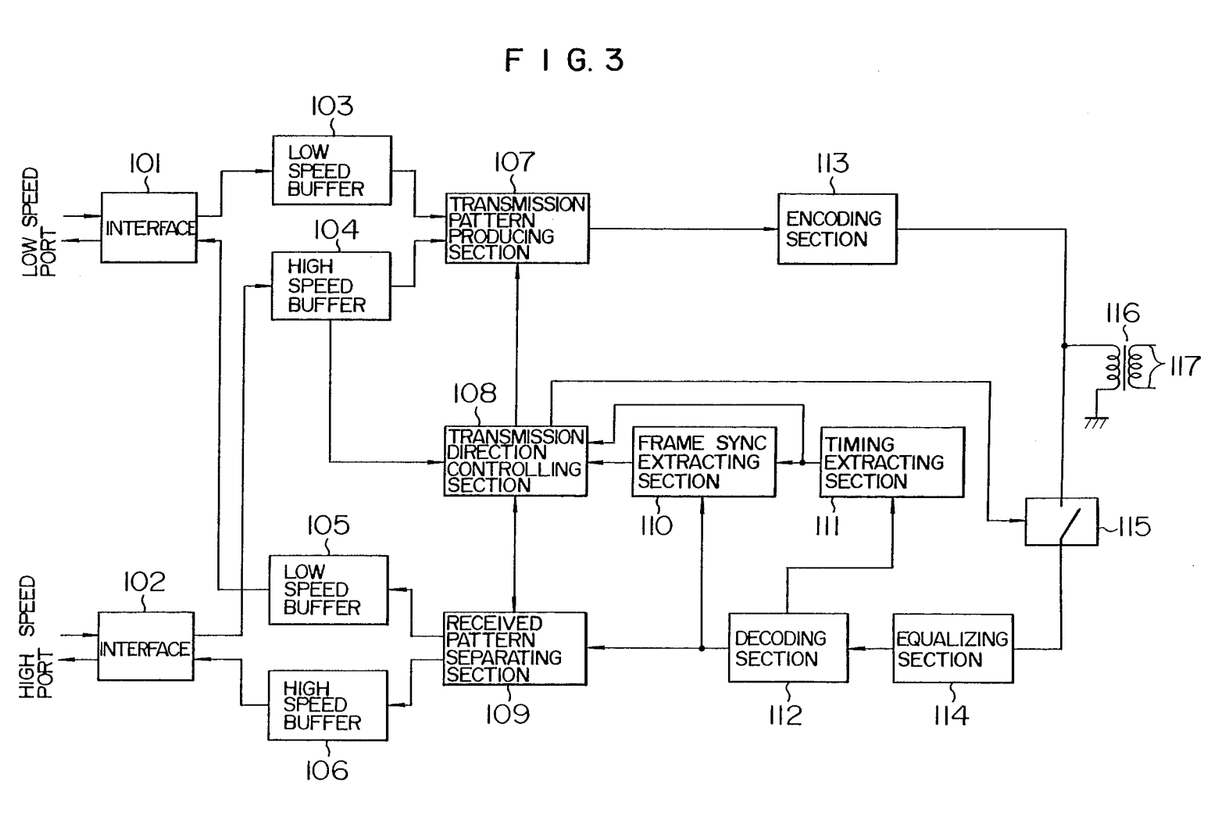
FIG. 3 is a block diagram of an example of a transmitter/receiver used in bidirectional transmission in one embodiment of the present invention.

FIG. 3 shows a configuration of an embodiment of the data transmitter/receiver 1 or 2. Input signals from a low speed port and a high speed port are stored in buffers 103 and 104 through interfaces 101 and 102, respectively. Transmission data is generated by a transmission data pattern generator 107 under the control of a direction controller 108 which executes the direction control algorithm described above. An encoder 113 encodes transmission data to a transmission line code which is sent to a two-wire transmission line 117 through a transformer 116. On the other hand, a signal received from the two-wire line 117 is supplied to an equalizer 114 only for a data reception time through a switch 115 which is controlled by the direction controller 108. The output of the equalizer 114 is decoded to an NRZ signal from the transmission line code by a decoder 112 and separated into a low speed port signal and a high speed signal by a received signal separaor 109. The outputs of the separator 109 are supplied to the respective ports through buffers 105 and 106 and the interfaces 101 and 102. The output of the equalizer 114 is also supplied to a timing extractor 111 which extracts a clock signal to be used in the reception operation. A frames synchronization extractor 110 synchronizes frame based on the output of the decoder 112 and supplies frame information to the direction controller 108.

Figure 4A:
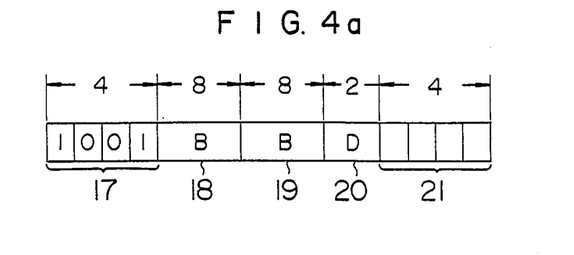
FIGS. 4a to 4c are signal formats in an embodiment of the present invention.
Figure 4B:
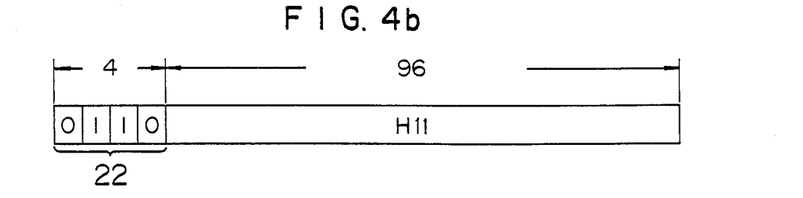
Figure 4C:
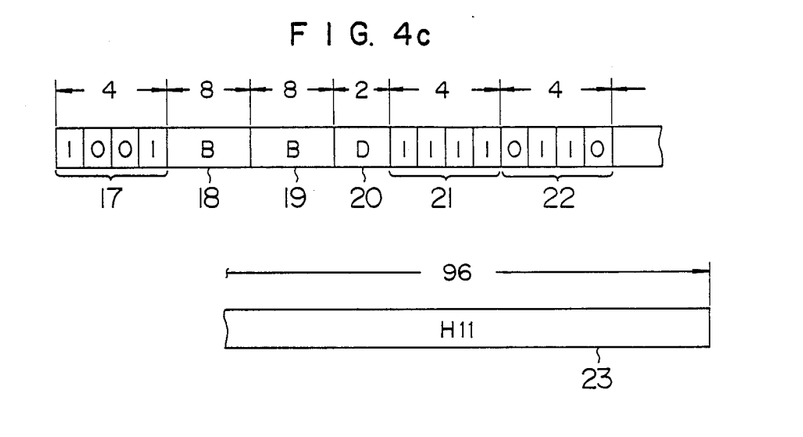

FIGS. 4a to 4c are signal formats. Two channels B and one channel D are allotted to the low speed data, and a channel H11 is allotted to the high speed data. As shown in FIG. 4a, the low speed data comprises F1 flag pattern "1001" 17 for frame synchronization, two 8-bit channel B data 18 and 19, 2-bit channel D (control channel) data 20, and 4-bit direction control data 21 indicating whether the high speed data is to follow or not. When the high speed data is to be transmitted after the low speed data has been transmitted, the direction control bits are set to "1111", and when the high speed data is not to be transmitted, they are set to "0000".

As shown in FIG. 4b, the high speed data frame comprises 4-bit F2 flag pattern 22, which is for the high speed data frame synchronization, and 96-bit channel H11 data 23. In FIG. 4c, the high speed data shown in FIG. 4b is sent following to the low speed data shown in FIG. 4a. In FIG. 4c, guard times are omitted for simplicity.

Figure 5:
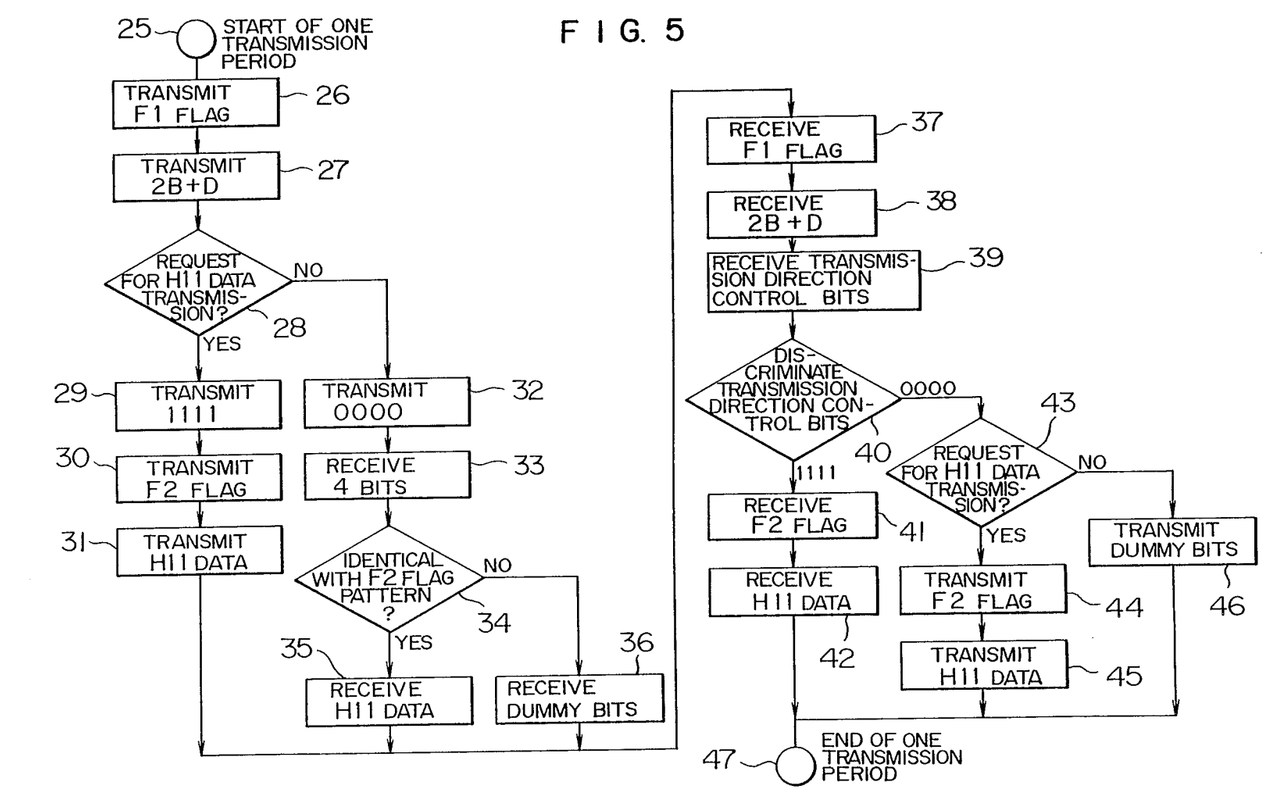
FIG. 5 is a flow chart of a transmission direction control algorithm utilized in an embodiment of the present invention.

FIG. 5 shows an algorithm to control the direction in the signal formats shown in FIGS. 4a to 4c. When station A transmits data, the 4-bit flag F1 for frame synchronization is sent (26), and the 18-bit data 2B+D is sent (27), whether the transmission of the data H11 has been requested or not is checked (28), and if it has, the direction control signal "1111" is sent (29), and then the 4-bit flag F2 and the 96-bit data H11 are sent (30, 31). On the other hand if the request to transmit the data H11 has not been issued, the direction control bits "0000" are sent (32). The first 4 bits of the signal transmitted from station B are received (32) and they are compared with the flag F2 pattern. If they are equal, the following 96-bit signal is received as the data H11 (35). If they are not equal, the following 96-bit signal is handled as dummy data (36).

Then, station A receives the flag F1 transmitted from station B (37). Then, it receives the 18-bit data 2B+D (38) and the direction control bits (39). If the direction control bits are "1111" (40), the subsequent 4-bit flag F2 and 96-bit data H11 are received (41, 42). If the direction control bits are "0000", the transmission request for the data H11 from station A is checked (43). If the request has been issued, the station A transmits the 4-bit flag F2 and the 96-bit data H11 (44, 45). If the request has not been issued, the station A sends 100-bit all-zero pattern (46). In this manner, one transmission period is completed.

A configuration of an embodiment of an apparatus for implementing the direction control described above is shown in FIG. 6. It shows details of the transmission pattern generator 107, direction controller 108 and received pattern separator 109 shown in FIG. 3. The operation of the circuit will be explained in the sequence shown in the flow chart of FIG. 5.

Figure 6:
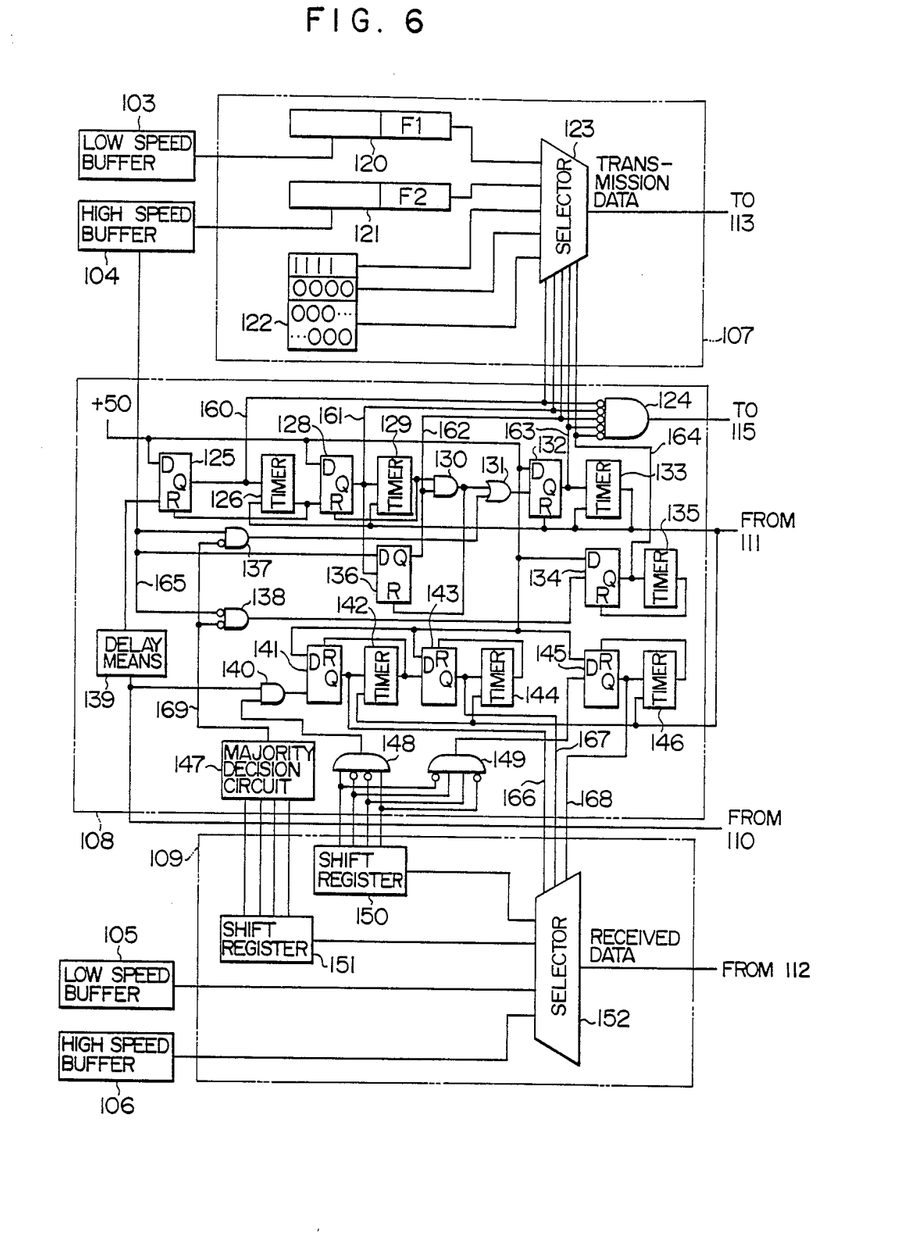
FIG. 6 is a circuit diagram of a major portion of the embodiment shown in FIG. 5.

The channel 2B+D data is stored in the low speed data buffer 103, and the channel H11 data is stored in the high speed data channel buffer 104. The data 2B+D is extracted 18 bits at a time and transferred to a shift register 120. The data H11 is extracted 96 bits at a time and transferred to a shift register 121. The shift register 120 has 22 bits, and the data 2B+D is stored in the left 18 bits and the flag F1 "1001" is stored in the right 4 bits. Similarly, the shifft register 121 has 100 bits, and the data H11 is stored in the left 96 bits and the flag F2 "0110" is stored in the right 4 bits. A ROM 122 stores transmission state flags "1111" and "0000" and dummy bits of all-zero pattern.

The frame synchronization extractor 110 of FIG. 3 extracts the 8 KHz frame synchronization signal by using the flag F1 of the received signal. It is delayed by 62.5 μs by a delay line 139, shown in FIG. 6, to produce a transmission timing signal. A flip-flop 125 is triggered by the transmission timing signal and a line 160 is set to a high (H) level while a timer 126 counts 22 bits and a selector 123 selects the shift register 120 output so that the flag F1 and the data 2B+D are sequentially transmitted. Then, a flip-flop 128 is triggered and a line 161 is set to the H level. A flip-flop 136 is simultaneously triggered so that a line 162 is set to the same level as a logical level of a line 165. The line 165 comes from the high speed data buffer 104 and it is H level if the request to transmit the data H11 is issued, and L level if the request is not issued. Accordingly, if the request is issued, the line 161 is H level and the line 162 is also H level. Thus, the selector 123 selects the pattern "1111" of the ROM 122 and transmits it. On the other hand, if the request is not issued, the line 161 is H level and the line 162 is L level. Thus, the selector 123 selects the pattern "0000" of the ROM 122 and transmits it. If the request for the data H11 is not issued, the transmission is then terminated. If the request for the data H11 is issued, the flip-flop 132 is triggered and a line 163 is set to the H level and the selector 123 selects the shift register 121. This state lasts until a timer 133 counts 100 clocks at the end of transmission, all lines 160, 161, 162, 163 and 164 are set to the L level and a gate 124 detects the end of transmission and turns a switch 115 to the reception position.

In the receiver, a selector 152 normally selects a shift register 150, and gages 148 and 149 detect the flags F1 and F2, respectively.

When the flag F1 pattern "1001" is detected, a gate 140 checks if timing thereof matches that of the previously extracted frame synchronization signal, and if so a flip-flop 141 is triggered. The line 166 is kept in the H level for a period of 187 clock pulses by a timer 142, and selector 152 selects the low speed data buffer 105 to transmit the data 2B+D. Then, a flip-flop 143 is triggered and a timer 144 keeps a line 167 H level for a period of 4 clock pulses, and the selector 152 selects the shift register 151. Then, the direction control bits are checked. In order to allow exact determination even if one bit had an error during the transmission, a majority decision circuit which produces the H level if the number in "1" bits of the 4 bits is larger than that of "0" bits. If the number data H11 is to be transmitted continuously, the H level signal is produced, and if the transmission is completed, the L level signal is produced. After the direction control bits have been received, the flip-flop 143 is reset so that the selector again selects the shift register 150. If the flag F2 is detected, the flip-flop 145 is triggered and the line 168 is kept at the H level while the timer 146 counts 96 clock pulses, and the selector 152 selects the high speed data buffer 106 to receive the data H11.

On the other hand, if the received direction control bits are "0000∞", a line 169 is set to the L level. If the sending station has the dta H11 to be transmitted, a line 165 is at H level and the flip-flop 132 is triggered so that the data H11 is transmitted. If the sending station has no data H11 to be transmitted, the line 165 is at the L level and a gate 138 produces the H level. Thus, the flip-flop 134 is triggered, and the line 164 is set to the H level and the selector 123 selects the dummy pattern or all-zero pattern in the ROM 122. This state lasts until the timer 135 counts 100 clocks. In this manner, one transmission/reception period is completed.

In the present embodiment, the data transmitter/receivers in both of the terminal stations may be implemented by a common algorithm and circuit.

Figure 7:
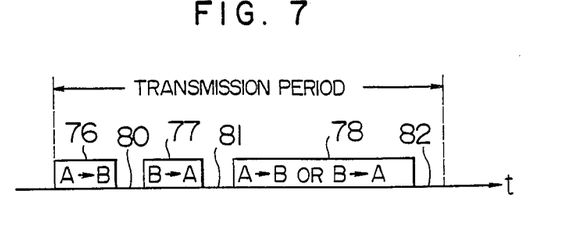
FIG. 7 illustrates operation of another embodiment of the present invention.

FIG. 7 shows a signal format in one transmission period in another embodiment of the present invention. In the present embodiment, one transmission period is divided into two time sections 76 and 77, in which data is transmitted in a fixed direction from A to B or B to A, and a time section 78 in which data is transmitted either from A to B or from B to A.

More particularly, one transmission period is 125 μs (8 KHz) and a transmission speed is 2.04 MHz. Thus, 256 bits can be arranged in a 125 μs time region. Of the 256 bits, 16 bits are allotted to each of the fixed transmission direction time sections 76 and 77, 184 bits are allotted to the unidirectional transmission time section 78, and the remaining 40 bits (=256−184−2×16) are allotted to guard times 80, 81 and 82.

Each of the 16-bit time sections 76 and 77 includes a 4-bit frame synchronization signal, a 2-bit signaling signal and a 2-bit transmission direction control signal for the unidirectional transmission time area 78.

With the signal format described above, four channels,
(a) a 64 Kbps channel for bilateral low speed data transmission,
(b) a 16 Kbps signaling channel (which can be used as a channel D of an Integrated Services Digital Network (ISDN) when a data terminal equipment (DTE) is an exchanger), (c) a 16 Kbps channel for controlling the transmission direction of the unidirectional transmission time section, and (d) a 1.472 Mbps channel for half-duplex communication.

As an embodiment of the transmission direction control for the unidirectional transmission time section, a method for controlling the tranmission direction when one of the data transmitter/receivers is used as a master station will be explained. Two bits S and T (the bit S transmitted from A to B is represented by $S_{A \rightarrow B}$, and the bits S and T transmitted from B to A are represented by $S_{B \rightarrow A}$ and $T_{B \rightarrow A}$, respectively) of the transmission direction control channel are used for the direction control. ($T_{A \rightarrow B}$ is not used.) $S_{A \rightarrow B}$="1" indicates that the unidirectional transmission time section 78 is used for data transmission from A to B or from B to A, and $T_{B \rightarrow A}$="1" indicates the presence of data transfer from B to A. The operation of the data transmitter/receiver A is as follows.

(a) If the $T_{B \rightarrow A}$ bit of one transmission period earlier is "0" and the request for data transmission to B is present, $S_{A \rightarrow B}$ is set to "1" and the unidirectional transmission line is used for the A→B data transmission.

(b) If the $T_{B \rightarrow A}$ bit of one transmission period earlier is "0" and the request for data transmission to B is absent, $S_{A \rightarrow B}$ is set to "0", and if $S_{B \rightarrow A}$ is "1", the data from B is received.

(c) If the $T_{B \rightarrow A}$ bit of one transmission period earlier is "1" and the request for data transmission to B is present, then the request for bilateral data transfer is present, and the transmission direction is selected to be opposite to the previous one. If the transmission direction is from A to B, $S_{A \rightarrow B}$ is set to "1" and the data is transmitted to B. If the transmission direction is from B to A, $S_{A \rightarrow B}$ is set to "0" and the data from B is received.

(d) If $T_{B \rightarrow A}$ of one transmission period earlier is "1" and the request for data transmission to B is absent, $S_{A \rightarrow B}$ is set to "0" and the data from B is received.

On the other hand, the data transmitter/receiver B operates as follows:

(a) If the request for data transmission to A is absent and $S_{A \rightarrow B}$ is "1", the data from A is received.

(b) If the request for data transmission to A is present and $S_{A \rightarrow B}$ is "0", $S_{B \rightarrow A}$ is set to "1" and the data is transmitted to A. If $S_{A \rightarrow B}$ is "1", then $S_{B \rightarrow A}$ is set to "0" and $T_{B \rightarrow A}$ is set to "1" and the data from A is received.

Figure 8:
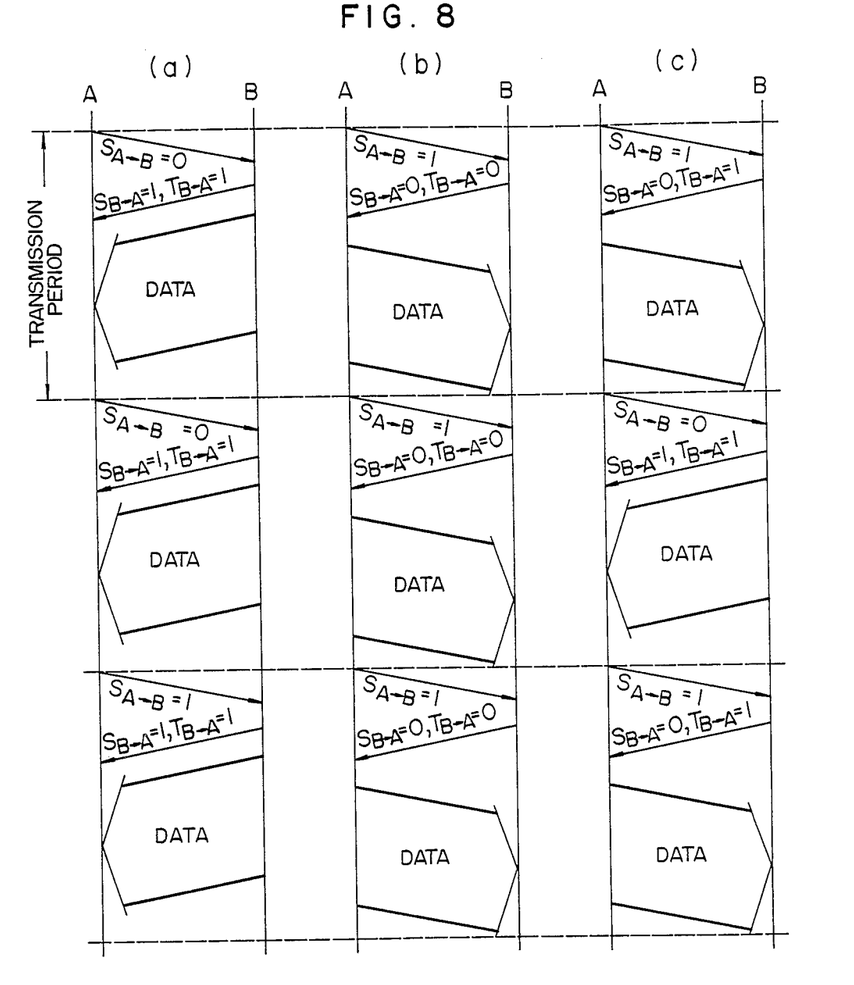
FIG. 8 illustrates a time-serial operation of the embodiment shown in FIG. 7.

An example of communication which uses the communication direction control system described above is shown in FIG. 8, in which $S_{A \rightarrow B}$, $S_{B \rightarrow A}$ and $T_{B \rightarrow A}$ and the direction of data transmission through the 1.472 Mbps communication channel are shown. In FIG. 8(a), only the request for communication from B to A exists. Since $S_{A \rightarrow B}$="0", the data can be continuously transmitted from B to A. Similarly, in FIG. 8(b), only the request for communication from A to B exists. In FIG. 8(c), the requests for communication from A to B and from B to A exist. The direction of communication of the 1.472 Mbps communication channel alternates between from A to B and from B to A for each frame.

As shown in FIG. 8, in accordance with the present embodiment, the continuous transfer at 1.472 Mbps is attained in the half-duplex communication, and the full-duplex communication at 0.736 mbps is attained without modifying the hardware.

If the direction of transmission is fixed to one direction, 1.472 Mbps unidirectional communication is attained.

A configuration of transmitter/receiver to implement the method shown in FIG. 7 may be essentially same as those shown in FIGS. 3 and 4a-4c. A specific configuration may vary depending on a transmission speed and the number of bits.

Since one unidirectional transmission time section (78 in FIG. 7) exists in one transmission period and it is behind the two fixed direction time sections 106 and 107, the configuration of the logic circuit of the direction controller of FIG. 2 is different from that of FIG. 6.

Figure 9:
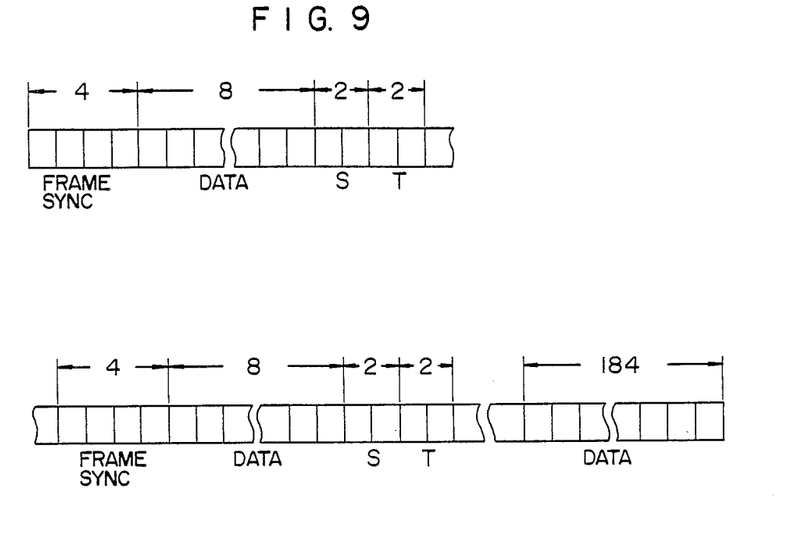
FIG. 9 is a signal format in one embodiment of the present invention.

FIG. 9 shows an example of signal format in the embodiment of FIG. 7.

We claim:

1. A method for bidirectionally transmitting data between two terminal stations through a transmission line by switching in time the direction of data transmission, comprising the steps of:

configuring a transmission signal frame with a first time section having a fixed transmission direction and a second time section having a variable transmission direction, wherein information data and transmission direction control data are transmitted during said first time section from one of the terminal stations to the other of the terminal stations;

detecting the transmission direction control data in said other of the terminal stations; and determining the transmission direction for said second time section on the basis of the detected transmission direction control data.

2. A method for bidirectionally transmitting data according to claim 1, in which said determination of the transmission direction for said second time section is made on the basis of said transmission direction control data and communication request data from said one of said terminal stations.

3. A method of bidirectionally transmitting and receiving data between first and second terminal stations coupled to each other through a transmission medium, said method comprising the steps of:

performing a relatively low speed transmission of information data and control data in a predetermined direction between said first and second terminal staions during a first time section within a transmission period;

detecting said control data; and performing a relatively high speed transmission of data in a selected direction between said first and second terminal stations, during a second time section following said first time section in the transmission period, the selected direction being determined on the basis detected control data.

4. A method of bidirectionally transmitting and receiving data between first and second terminal stations coupled to each other through a transission medium, said method comprising the steps of:

performing, at a relatively low speed, fixed transmission/reception of information data and control data in two predetermined opposite directions between said first and second stations;

detecting said control data; and performing, at a relatively high speed, transmission/reception of data in a selected direction between said first and second terminal stations, the selected direction being determined on the basis of the detected control data in one of said two predetermined opposite directions during the immediately preceding fixed transmission/reception.

5. A method for bidirectionally transmitting data between two terminal stations through a transmission line by switching in time the direction of data transmission, comprising the steps of:
configuring a transmission signal frame with a first time section, having a first area with a first transmission direction and a second area with a second transmission direction opposite the first transmission direction, and a second time section, having a variable transmission direction; and
determining the transmission direction for said second time section on the basis of control information transmitted in said first time section.

6. A method for bidirectionally transmitting data according to claim 5, wherein said second time section comprises two additional areas each preceded by one of the areas of said first section and each having a variable transmission direction determined on the basis of control information transmitted in the immediately preceding first section area.

7. A method for bidirectionally transmitting data according to claim 6, wherein the two areas of said first time section and the two areas of said second time section comprise fixed transmission direction areas alternating with variable transmission direction areas.

8. A method for bidirectionally transmitting data according to claim 5, wherein said second time section comprises a single area.

9. A method for bidirectionally transmitting data according to claim 8, wherein one of said two terminal stations is a master station and the other station is a slave station, said method comprising sending a control signal of a communication request from said slave station to said master station in said first time section of one transmission signal frame, and when said slave station receives a control signal of transmission permission from said master station in the first time section of the next transmission signal frame, transmitting data from said slave station to said master station in the second time section of said next transmission signal frame.

10. A transmitter/receiver unit for use in time division communication over a communication line to another transmitter/receiver, with communication occurring in transmission signal frames including a low speed data transmission time section, for transmission of information data and transmission direction control data, followed by a high speed data transmission time section, said transmitter/receiver unit comprising:
means for detecting transmission direction control data in transmissions during the low speed transmission time sections;
timing means;
switch means responsive to detection of transmission direction control data for controlling the direction of data transmission during high speed transmission time sections on the basis of detected transmission direction control data for time periods determined by said timing means.

11. A transmitter/receiver unit according to claim 10, wherein said timing means includes means for indicating the beginning of each transmission signal frame.

12. A transmitter/receiver according to claim 10, further comprising first circuit means for detecting the presence or absence of data for transmission during high speed transmission time sections.

13. A transmitter/receiver according to claim 12, further comprising second circuit means for transmitting a dummy signal during high speed transmission time sections when said first circuit means detects the absence of data.

14. A transmitter/receiver unit as claimed in claim 10 further comprising third means responsive to received communication requests for generating a communication request signal; and wherein said switch means is further responsive to the communication request signal for generating the switch control signal.

* * * * *